(12) United States Patent
Nemoto (10) Patent No.: US 6,666,423 B1
(45) Date of Patent: Dec. 23, 2003

(54) RATCHET-TYPE LEVER MECHANISM FOR SEAT LIFTER

(75) Inventor: Akira Nemoto, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/157,830

(22) Filed: May 31, 2002

(51) Int. Cl.[7] .............................................. F16M 13/00
(52) U.S. Cl. ........................ 248/421; 248/422; 248/396; 297/344.15
(58) Field of Search ................................ 248/421, 422, 248/396, 394, 397, 372.1; 297/344.15, 344.17, 344.12

(56) References Cited

U.S. PATENT DOCUMENTS

| | | | | |
|---|---|---|---|---|
| 3,695,570 A | * | 10/1972 | Ishida | 248/397 |
| 4,767,156 A | * | 8/1988 | Yamada et al. | 297/313 |
| 4,834,333 A | | 5/1989 | Saito et al. | |
| 5,882,061 A | * | 3/1999 | Guillouet | 296/65.05 |
| 6,290,198 B1 | * | 9/2001 | Kojima et al. | 248/422 |
| 6,446,527 B2 | * | 9/2002 | Masuda et al. | 74/535 |
| 6,464,193 B1 | * | 10/2002 | Nemoto | 248/421 |
| 6,484,995 B1 | * | 11/2002 | Nemoto | 248/421 |

FOREIGN PATENT DOCUMENTS

| | | | |
|---|---|---|---|
| JP | 2000-255294 | * | 9/2000 |
| JP | 2000-355237 | * | 12/2000 |
| JP | 2002-301957 | * | 10/2002 |

* cited by examiner

Primary Examiner—Leslie A. Braun
Assistant Examiner—Tan Le
(74) Attorney, Agent, or Firm—Browdy and Neimark, P.L.L.C.

(57) ABSTRACT

A ratchet-type lever mechanism for seat lifter, which comprises a brake unit whose shaft is connected with a mechanism of the seat lifter, two ratchet gear wheels provided about the shaft of brake unit, a shaft rotatable in a spaced-apart relation with the brake unit shaft, an operating lever connected with the shaft, and a sector ratchet gear element provided between the operating lever and two ratchet gear wheels. The sector ratchet gear element is so arranged in the lever mechanism to enable a user to rotate the operating lever in usual way without confusion about direction of rotation of the lever to cause upward and downward motions of the seat lifter. The sector ratchet gear element may be of an outwardly-toothed type having two outwardly toothed arcuate gear teeth and two sector gear portions, or may be of an inwardly-toothed type having two inwardly toothed arcuate gear teeth.

4 Claims, 4 Drawing Sheets

RATCHET-TYPE LEVER MECHANISM FOR SEAT LIFTER

BACKGROUND OF INVENTION

1. Field of the Invention

The present invention relates to a ratchet-type lever mechanism for seat lifter (or seat height adjuster), which is operable by rotation of an operation lever to actuate the seat lifter for the height adjustment of seat. Particularly, the invention is directed to a ratchet-type lever drive mechanism having a ratchet gear system provided about the shaft of a brake unit operatively connected with a seat lifter, wherein an operating lever can be rotated to cause the brake unit shaft to rotate in a desired direction corresponding to the direction in which the seat lifer is raised or lowered.

2. Description of Prior Art

A seat height adjuster or what is known as a seat lifter is incorporated in automotive seat to enable an occupant on the seat to selectively adjust the height of seat according to his or her physique and seating posture. In the seat lifter, typically known is a linkage-type seat lifter having forward and rearward links which are interlockingly movable and pivotally coupled with the forward and rearward portions of the seat, respectively, so that the seat may be raised and lowered via those two links. This seat lifter includes plural transmission gears (reduction gears and the like), a brake-unit, and a drive mechanism provided with a lever or handle, wherein the drive mechanism is operatively connected through the transmission gears and bake unit to the forward and rearward links. As known in the art, the brake unit provides a braking action on the drive mechanism to normally lock the links to a given position. Conventionally, the drive mechanism is provided with a dial-type rotary handle which is directly connected with a shaft of the brake unit. However, since a great load is applied to the seat lifter and the brake unit, it is highly possible that a user will use quite more force than normally required to rotate such dial-type handle with his and her one hand. In view of such problem, for instance, a ratchet-type lever drive mechanism is disclosed in the Japanese Laid-Open Patent Publication No. 2000-255295. According thereto, instead of the dial handle, an operating lever is used, which is connected with two ratchet pawl gears, and two ratchet wheel gears are fixed to the output shaft of the brake unit, such that, by vertical rotation of the operating lever, one of the two pawl gears may be selectively meshed with a corresponding one of the two ratchet wheel gears, thereby causing upward and downward motions of the seat lifter to raise and lower a seat to a desired level.

Figure 1:
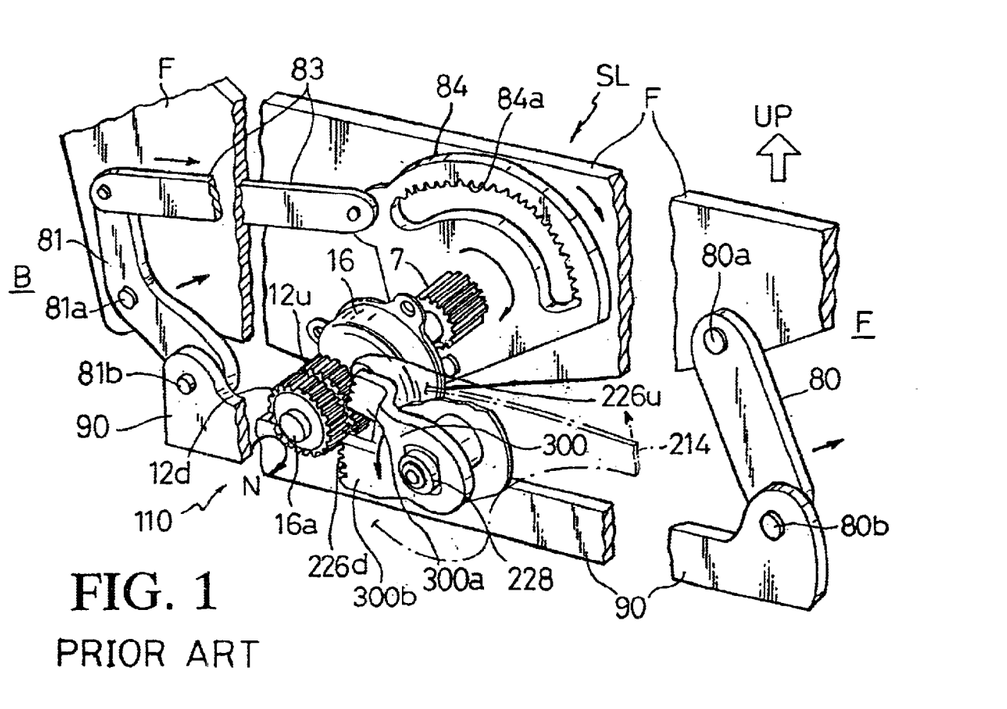
FIG. 1 is a partly broken schematic perspective view showing a part of seat lifter of normal-rotation-type with its associated mechanism and a conventional ratchet-type lever mechanism applied thereto.

FIG. 1 a typical example of seat lifter (SL) provided with a conventional ratchet-type lever mechanism (110) similar to the foregoing mechanism. As is known, the seat lifter (SL), although only its one lateral side portion is shown, basically comprises a pair of forward link (80) and backward link (81), and a sector gear (84) pivotally connected via a connecting link (83) with the backward link (81). The forward link (80), facing to a side (F) forwardly of the seat lifter and seat cushion frame (F), is pivotally connected at its upper end with the seat cushion frame (F) via a pin (80a) and likewise connected at its lower end with a base frame or an upper rail of slide rail device (designated by (90)) via a pin (80b). The backward link (81), facing to a side (B) backwardly of the seat lifter (SL) and seat cushion frame (F), is at its midway part pivoted to the seat cushion frame (F) via pin (81a), while being pivotally connected at its lower end with the base frame or upper rail (at 90) via a pin (81b). The sector gear (84) is rotatably connected to the seat cushion frame (F). In the shown mode, an inwardly toothed gear portion (84a) is formed in the sector gear (84). Sector gear (84) is rotatably fixed to the seat cushion frame (F). On the other hand, the ratchet-type lever mechanism (110) includes a pair of first and second ratchet wheel gears (12u)(12d) fixed to the shaft of brake unit (16), and a bifurcated ratchet gear (300) connected with an operating lever (214). Though not shown, the first ratchet wheel gear (12u) has a known one-way clutch built therein, by which the gear (12u) itself is only permitted to rotate together with the shaft (16a) of brake unit (16) in clockwise direction to cause upward motion of the seat lifer (SL) to raise the seat cushion frame (F), while being free to rotate about the brake unit shaft (16a) in anticlockwise direction. On the other hand, the second ratchet wheel gear (12d) has another one-way clutch therein for only permitting the gear (12d) itself together with the brake unit shaft (16a) to rotate in anticlockwise direction to cause downward motion of the seat lifter (SL) to lower the seat cushion frame (F), while being free to rotate about the brake unit shaft (16a) in clockwise direction. The bifurcated ratchet gear element (300) is formed with a first pawl gear (300a) and a second pawl gear (300b), wherein the first pawl gear (300a) is bent and offset from the second pawl gear (300b). As s shown, the bifurcated ratchet gear (300) is securely supported on a bearing shaft (228) connected with the operating lever (214) and normally positioned at a point where both first and second pawl gears (300a)(300b) are out of mesh with the respective first and second ratchet wheel gears (12u)(12d).

As found in the foregoing conventional combination of ratchet-type lever mechanism (110) and seat lifter (SL), it has been customary that upward rotation of the operating lever (214) results in likewise upward movement of seat cushion frame (F) or a seat via the seat lifter (SL) for the sake of easiness in operation. Otherwise stated, in the seat lifter (SL), the backward link (81), the sector gear (84) and the connecting link (83) establish a particular transmission mechanism through which a normal upward rotation of operating lever (214) by a user or seat occupant is transmitted to both two links (80) (81), thereby transforming the rotation into upward motion of the seat lifter (SL) itself to raise a vehicle seat (not shown). Specifically, when a user rotates the lever (214) upwardly as indicated by the one-dot-chain arrow, the bifurcated ratchet gear (300) is rotated anticlockwise, bringing the first pawl gear toothed portion (226u) to mesh with the first ratchet gear wheel (12u). Then, as indicated by the arrows, both first ratchet gear wheel (12u) and shaft (16a) of brake unit (16) are rotated clockwise to cause simultaneous clockwise rotation of pinion gear (7) meshed with the inwardly toothed portion (84a) of sector gear (84), which in turn causes the likewise clock rotation of the sector gear (84).

Such clockwise rotation causes upward rotation of both two links (80) to raise the seat cushion frame (F) or not-shown seat. Therefore, this particular transmission mechanism of seat lifter (SL) naturally requires clockwise rotation as "normal direction of rotation" for upward motion to raise a vehicle seat, as indicated by the arrow (N) in particular.

Figure 2:
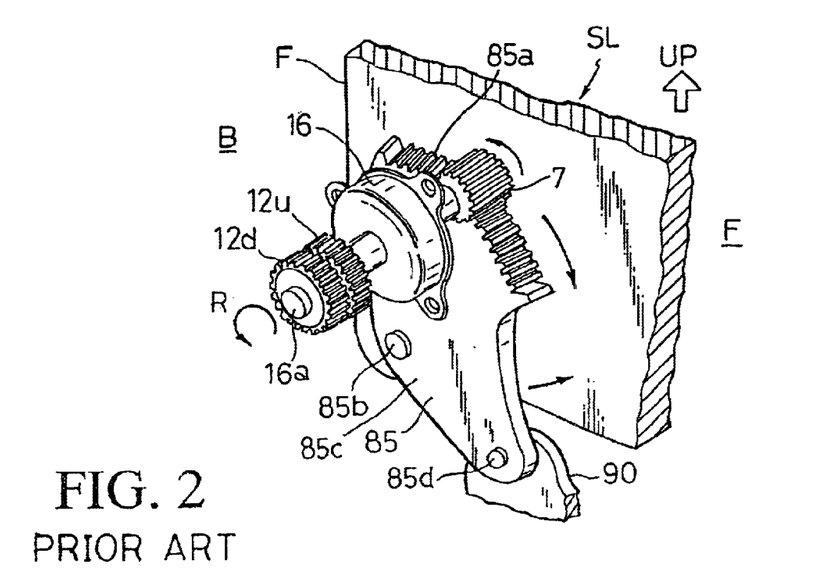
FIG. 2 is a fragmentary schematic perspective view showing a part of seat lifter of reverse-rotation-type and its associated mechanism.

In contrast to such normal-rotation-type lever mechanism (110), there has been known a reverse-rotation-type seat lifter having a particular transmission mechanism requiring anticlockwise rotation as a "reverse direction of rotation" to raise the vehicle seat. This is shown in FIG. 2, by way of one example, as designated by (SL'), which is basically identical to the afore-said seat lifter (SL), only excepting a sector gear arrangement (85) including an outwardly toothed gear (85a) and an integral backward link portion (85c). In other words, the transmission mechanism of this seat lifter (SL') is formed by such combination of outwardly-toothed gear teeth (85a) and backward link portion (85c). Specifically, according to this reverse-rotation-type seat lifter (SL'), the sector gear arrangement (85) is pivotally secured by a pin (85b) to the seat cushion frame (F), while being at its integral backward link portion (85c) pivotally connected with the base member (90). Meshed with the outwardly-toothed gear teeth (85a) is the pinion gear (7) of the brake unit (16). Due to this particular structure, the shaft (16a) of brake unit (16) must be rotated anticlockwise, as indicated by the arrow (R), in order to raise the seat cushion frame (F).

However, when applying the foregoing known ratchet-type lever mechanism (110) to such reverse-rotation-type seat lifter structure (SL') or other similar seat lifters having a mechanism requiring a reverse rotation to a normal rotation of operating lever (214) that has been usually done by a user or seat occupant, it is inevitable that the user or seat occupant will be confused and uncomfortable with operation of the lever (214) because he or she will do the opposite of what have been done to raise and lower the seat. That is, when it is desired to raise the seat, the user will have to rotate the lever (214) downwardly as opposed to the upward rotation that has been normally required to raise the seat.

To solve such problem, a rotation conversion or switchover mechanism may be used to change the reverse rotation direction into a normal rotation direction. But, it will result in a complicated structure of the whole seat lifter and ratchet-type lever mechanism, and increased number of parts required as well as undesired high costs involved therein.

SUMMARY OF THE INVENTION

In view of the above-stated drawbacks, it is therefor a primary purpose of the present invention to provide an improved ratchet-type lever mechanism which permits normal rotation of operating lever in usual way without confusion to actuate a seat lifter means which includes: a brake means having a shaft operatively connected therewith, the brake means being adapted to provide a braking action to upward and downward motions of the seat lifter means and being rotatable in one of a first direction and a second direction opposite to the first direction; and a transmission mechanism operatively connected between the brake means and the seat lifter means, the transmission mechanism requiring a reverse rotation of the operating lever to cause the upward and downward motions of the seat lifter means in contrast to normal first and second rotations of the operating lever, wherein rotation of the shaft of brake means in said first direction is converted via the transmission mechanism into the downward motion of seat lifter means, and whereas rotation of the shaft of brake means in the second direction is converted via the transmission mechanism into the upward motion of seat lifter means, In order to achieve such purpose, a ratchet-type lever mechanism in accordance with the present invention is basically comprised of:

a first ratchet gear wheel means rotatably provided about the shaft of brake means, which is so designed to be rotatable together with the shaft of brake means only when the shaft of brake means is rotated in the first direction;

a second ratchet gear wheel means rotatably provided about the shaft of brake means, which is so designed to be rotatable together with the shaft of brake means only when the shaft of brake means is rotated in the second direction;

a shaft means rotatably disposed in a spaced-apart relation with the shaft of brake means; the shaft means being connected with the operating lever such that a center of rotation of the operating lever is at a central axis of the shaft means; and a ratchet gear means operatively provided between the shaft means and the first and second ratchet gear wheel means, the ratchet gear means including;

a sector gear means for transforming the reverse rotation of the operating lever required by the transmission mechanism into one of such normal first and second rotations of the operating lever, to thereby cause the shaft of the brake means to rotate in same direction as one of the normal first and second rotations of the operating lever, so that the normal first rotation of the operating lever causes the shaft of the brake means to rotate in the first direction, whereas the normal second rotation of the operating lever causes the shaft of the brake means to rotate in the second direction, the sector gear means having, defined circumferentially thereof, a first arcuate gear means and a second arcuate gear means in such a manner that the first arcuate gear means is defined in an offset relation with the second arcuate gear means with respect to a center of the ratchet gear means, with such an arrangement that, when the operating lever is positioned in a non-use position, the ratchet gear means is normally positioned in a neutral point where the first and second arcuate arcuate gear means are out of engagement with the first and second ratchet gear wheel means, respectively, and that, when the first rotation of the operating lever is effected from the non-use position to cause the upward motion of the seat lifter means, the ratchet gear means is rotated to bring the first arcuate gear means to meshed engagement with the first ratchet gear wheel means, whereas, when the second rotation of operating lever is effected to cause the downward motion of seat lifter means, the ratchet gear means is rotated to bring the second arcuate gear means to meshed engagement with the second ratchet gear wheel means, wherein the first rotation of said operating lever from the non-use position brings the first arcuate gear teeth to meshed engagement with the first ratchet gear wheel means, thereby causing rotation of the shaft of brake means in the first direction so as to cause the upward motion of the seat lifter means via the transmission mechanism, whereas the second rotation of operating lever from the non-use position brings the second arcuate gear teeth to meshed engagement with the second ratchet gear wheel means, thereby causing rotation of the shaft of brake means in the second direction so as to cause the downward motion of seat lifter means via the transmission mechanism.

Accordingly, a user can usually rotate the operating lever from the non-use position in one direction (e.g. in upward direction) to cause the upward motion of seat lifter means, and can also usually rotate the operating lever in another direction (e.g. in downward direction) from the non-use position to cause the downward motion of seat lifter means. In one aspect of the present invention, the first and second arcuate gear means may comprise a first outwardly-toothed sector gear teeth and a second outwardly-toothed sector gear teeth, respectively, and the sector gear means may comprise an outwardly toothed sector ratchet gear element including: a shaft disposed between the shaft means and the shaft of brake means; and a first outwardly-toothed sector gear element having, defined therein, a first outwardly-toothed sector gear portion and the first and second outwardly-toothed sector gear teeth in an integral manner; wherein the first outwardly-toothed sector gear element is rotatably provided on the shaft in such a manner that the first outwardly-toothed sector gear portion is disposed in a diametrically opposed relation with the first and second arcuate gear teeth with respect to the shaft; and a second outwardly-toothed sector gear element including a second sector gear portion formed therein, the second outwardly-toothed sector gear element being fixedly provided on the shaft means associated with the operating lever, wherein the second outwardly-toothed sector gear portion is in a meshed engagement with the first outwardly-toothed sector gear portion.

In another aspect of the present invention, the first and second arcuate gear means may comprise a first inwardly-toothed sector gear teeth and a second inwardly-toothed sector gear teeth, respectively. Also, the sector gear means may comprise an inwardly toothed sector ratchet gear element having a sectorial ring body in which the first and second inwardly-toothed sector gear teeth are formed, wherein the inwardly toothed sector ratchet gear element has: a connection end portion with which the operating lever is connected; and a securing portion defined between said sectorial ring body and the connection end portion, with the securing portion being fixedly connected with the shaft means.

Other various features and advantages will become apparent from reading of the descriptions hereinafter, with reference to the annexed drawings.

DETAILED DESCRIPTION OF PREFERRED EMBODIMENTS OF THE INVENTION

Reference being made to FIGS. 3 to 6, there are illustrated exemplary embodiments of ratchet-type lever mechanism for seat lifter, as generally designated by (10), in accordance with the present invention.

At first, as far as the herein-described embodiments are concerned, description will be made of the ratchet-type lever mechanism (10) on the understanding that it is used in combination with the reverse-rotation-type seat lifter (SL') which is structurally based on the normal-rotation-type seat lifter (SL), excepting the sector gear and backward link, as specified in the foregoing description of prior art with reference to FIGS. 1 and 2. Therefore, all like designations to be used hereinafter correspond to all like designations given in such prior art description and FIGS. 1 and 2, and repetition of description on the seat lifters (SL) and (SL') is omitted for the sake of simplicity. It should be noted, however, that those illustrations of FIGS. 1 and 2 are not limitative, but any other suitable structure of reverse-rotation-type seat lifter (SL') or any other seat lifter structure, which has a transmission mechanism requiring a reverse rotation in response to a normal rotation of operating lever, may be applied to the lever mechanism (10).

In accordance with the present invention, generically stated, the ratchet-type lever mechanism (10) features including a novel gear means for transmitting one of normal upward and downward rotations of operating lever into a proper rotation for causing rotation of a corresponding one of two ratchet gear wheels so as to actuate the reverse-rotation-type seat lifter (SL') (or, any other seat lifter structure with a transmission mechanism requiring a reverse rotation in response to a normal rotation of operating lever), thereby causing upward or downward motion of the links (80) (81).

Figure 3:
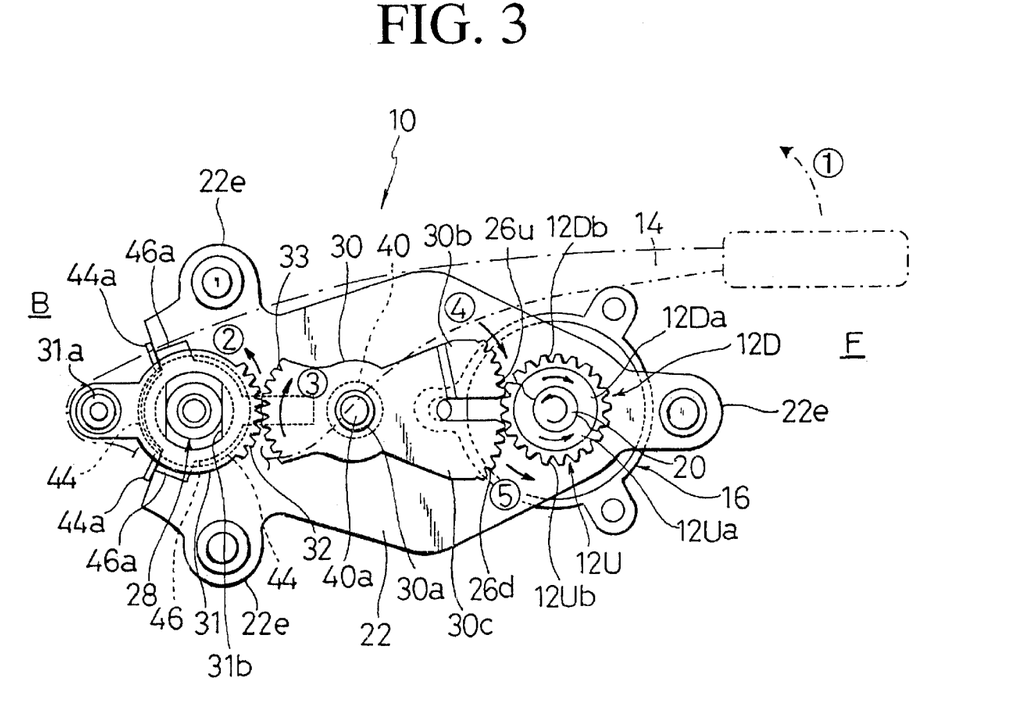
FIG. 3 is a schematic front view showing a first embodiment of ratchet-type lever mechanism in accordance with the present invention.
Figure 5:
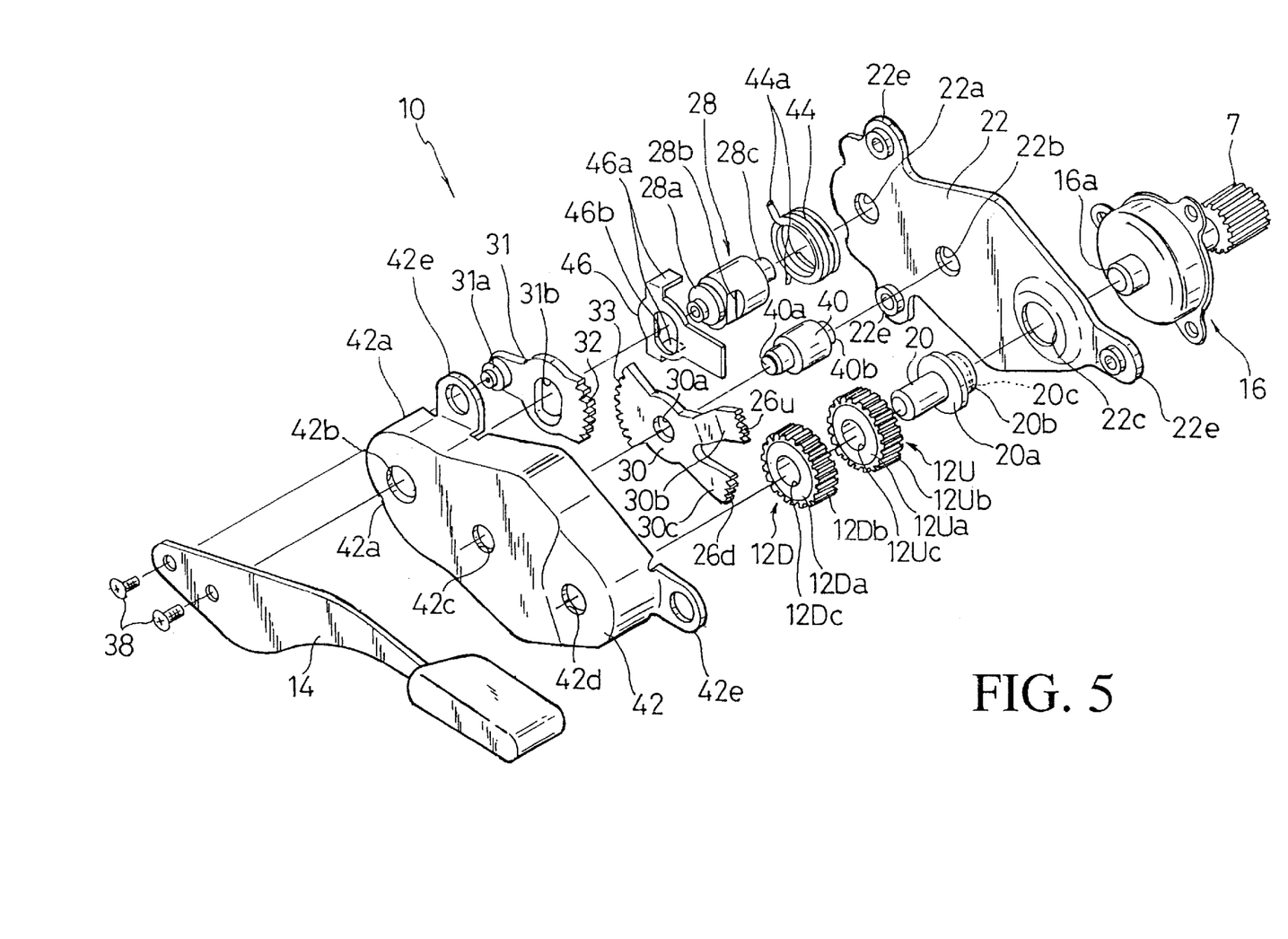
FIG. 5 is an explosive schematic view of the first embodiment of the FIG. 3.

Referring now to FIGS. 3 and 5, one exemplary mode of the ratchet-type lever mechanism (10) will be described.

As can be seen from FIG. 5, the mechanism (10) is provided as one unit having a base plate (22) and a housing cover (42), in which principal mechanical elements to be described are collectively accommodated.

The base plate (22) is formed with a first bearing hole (22a), a second bearing hole (22b) and a third bearing hole (22c). The housing cover (42) is likewise formed with first, second and third bearing holes (42b), (42c) and (42d) which are respectively in correspondence with those three bearing holes (22a), (22b) and (22c).

As similar to the conventional mechanism, a known brake unit (16) and a pair of known first and second ratchet gear wheels (12U) (12D), each incorporating a one-way clutch, are used in this particular mode. The details and functions of those brake unit (16) and gear wheels (12U) (12D) have been described previously and no further explanation thereof is omitted. In brief, the first and second ratchet gear wheels (12U) (12D) are limited by their own one-way clutches (not shown) as to their respective rotation directions. That is, as understandable from the arrows in FIGS. 3 and 4 in conjunction with FIGS. 5 and 6, the first ratchet gear wheel (12U) is rotatable together with the shaft (16a) of brake unit (16) only in anticlockwise direction, while being free to rotate about the shaft (16a) in clockwise direction. The second ratchet gear wheel (12D) is rotatable together with the brake unit shaft (16a) only in clockwise direction, while being free to rotate about the shaft (16a) in anticlockwise direction.

Designation (20) stands for a connecting shaft having a partition flange (20a), a bearing portion (20b) and a circular connecting recession (20c). Though not shown, the connecting shaft (20) and circular connecting recession (20c) may each be formed with a serration for spline connection purpose.

Rotatably supported on such connecting shaft (20) are the first and second ratchet gear wheels (12U) (12D) and the brake unit (16). The bearing portion (20b) of connecting shaft (20) is rotatably supported in the third bearing hole (22c) of base plate (22), and, under that state, the shaft (16a) of brake unit (16) is fixedly engaged in the circular connecting recession (20c) of connecting shaft (20) (preferably via spline connection), while the two ratchet wheel gears (12U) (12D) are, at their respective securing holes (12Uc) (12Dc), fixed on the connecting shaft (20) (preferably via spline connection). The end of that connecting rod (20) is rotatably supported in the third bearing hole (42d) of housing cover (42). Hence, the two gear wheels (12U) (12D) are rotatably journalled between the base plate (22) and housing cover (42) such that either of the two wheel gears (12U) (12D) is rotatable to thereby cause simultaneous rotation of the brake unit shaft (16a) in a corresponding direction of rotation. While not shown, as similar to the previously described prior-art ratchet gear wheels (12u) (12d), the first ratchet gear wheel (12U) has a known one-way clutch built therein, by which the gear (12U) itself is only permitted to rotate together with the shaft (16a) of brake unit (16) in a direction to cause upward motion of the seat lifer (SL') via the associated transmission mechanism (at 85a, 85c and 80 in FIG. 2 in conjunction with FIG. 1) so as to raise the seat cushion frame (F). Also, the second ratchet gear wheel (12D) has another one-way clutch therein for only permitting the gear (12D) itself to rotate together with the brake unit shaft (16a) in a direction to cause downward motion of the seat lifter (SL') through that transmission mechanism so as to lower the seat cushion frame (F).

Designation (40) denotes a gear bearing shaft having first and second end portions (40a) and (40b). In particular, the first end portion (40a) is relatively longer than the second end portion (40b) for the purpose of supporting a ratchet gear member (30) as will be described below. As shown, the first and second end portions (40a) and (40b) are firmly secured in the second bearing hole (22b) of base plate (22) and the sod bearing hole (42c) of housing cover (42), respectively.

In the present embodiment, generically stated, there is provided an outwardly toothed sector gear means, which is contemplated as one mode of the aforementioned novel gear means for transmitting one of normal upward and downward rotations of operation lever into a proper rotation for causing rotation of a corresponding one of the two ratchet gear wheels so as to actuate the reverse-rotation-type seat lifter (SL'). Such generic mode will now be described specifically with particular reference to FIGS. 3 and 5.

Namely, according to this embodiment, as such outwardly toothed sector gear means, an outwardly toothed ratchet gear element (30) is provided, which is so formed to have: a bearing hole (30a); a pair of first and second sector gear pieces (30b) (30c); and a sector gear portion (33). The first sector gear pawl piece (30b) which has first outwardly-toothed arcuate gear teeth (26u), is spaced apart and bent from the second sector gear piece (30c) in an offset fashion therefrom. The second sector gear piece (30c) has second outwardly-toothed arcuate gear teeth (26d). It is seen that, in the ratchet gear element (30), the sector gear portion (33) is disposed in a diametrically opposed relation with the first and second gear pieces (30b) (30c) in respect to the bearing hole (30a). It is also seen that the center of the sector gear portion (33) is disposed on the rectilinear line extending through a central point from which the first and second sector gear pieces (30b) (30c) are bifurcated. The center of the bearing hole (30a) is also disposed on such rectilinear line, serving as a rotation center of the ratchet gear element (30). The ratchet gear element (30) is at its hole (30a) rotatably supported on the first end portion (40a) of gear bearing shaft (40) in such a manner that the first and second outwardly-toothed arcuate gear teeth (26u) (26d) are oriented toward the respective first and second ratchet gear wheels (12U) (12D) for meshed engagement relation therewith.

Further, in this embodiment, there is provided a sector gear element (31) which has, formed therein, a non-circular securing hole (31b), a sector gear portion (32) and a connecting end portion (31a) to which an operation lever (14) is securely connected. It is seen that the sector gear portion (32) is disposed in a diametrically opposed relation with the connecting end portion (31a) in respect to the securing hole (31b) which is a rotation center of the sector gear element (31).

Designation (28) denotes a rotatable bearing shaft to which the operating lever (14) and the sector gear element (31) are securely connected. The rotatable bearing shaft (28) has one end (28c) rotataby fitted in the first bearing hole (22a) of base plate (22) and another end (28a) rotatably fitted in the first bearing hole (42b). This shaft (28) is formed with non-circular regions (28b) on the circular surface thereof.

It is seen that all axes of the bearing holes (22a, 22b, 22c, 42a, 42c and 42d) are disposed on the same rectilinear line and so are all the three shafts (20, 40 and 28) between the base plate (22) and housing cover (42).

Designation (46) denotes a spring connection plate having a pair of horizontally extending lugs (46a) and a non-circular connecting hole (46b) formed therein.

As understandable from FIG. 5, the spring connection plate (46) is securely attached at its non-circular hole (46b) about the peripheral circular surfaces and non-circular regions (28b) of the bearing shaft (28). Then, a spiral spring (44) is wound about the bearing shaft (28), with the two ends (44a) (44a) thereof being contacted with the two lugs (46a) (46a) of spring connection plate (46). Also, the sector gear element (31) is securely attached at its non-circular hole (31b) about the peripheral circular surfaces and non-circular regions (28b) of bearing shaft (28) and thus juxtaposed with the spring connection plate (46). Hence, both of the plate (46) and sector gear element (31) are retained on the shaft (28) in an integral way against rotation thereabout, but is free to rotate via the shaft (28) between the base plate (22) and housing cover (42). Though not clearly shown, the housing cover (42) has a pair of projections (42a) (42a) against which the two ends (44a) (44a) of spiral spring (44) are abutted, respectively. With such structure, therefore, the sector gear element (31) is normally biased by the spring (44) to a neutral point where the central point of sector gear portion (32) thereof is positioned on the aforementioned rectilinear line along which all three shafts (20, 40 and 28) are disposed. Also, under the biasing force of the spring (44), the operating lever (14) is normally retained in a non-use position as indicated by the one-dot chain line in FIG. 3.

As can be seen from FIG. 5, the base plate (22) are firmly coupled with the housing cover (42) by fixedly connecting the securing the ends (22e) of the former and the ends (42e) of the latter by means of suitable bolts and nuts (not shown).

As understandable from FIG. 3, in the assembled unit of lever mechanism (10), both sector gear portions (33) (32) are meshed partway with each other. In this respect, it is noted that, due to the biasing force of the spring (44), those two sector gear portions (33) (32) are normally meshed together at their respective central regions, while the first and second sector gear pieces (30b) (30c) are normally positioned such that their respective first and second outwardly-toothed gear teeth (26u) (26d) are both out of mesh with the corresponding first and second ratchet gear wheels (12u) (12d).

As shown, the base end portion of operating lever (14) is fixedly connected with the connection end portion (31a) of sector gear element (31) and another end (28a) of the shaft (28) by means of two securing screws (38) (38). Thus, the operating lever (14) is supported by the shaft (28) and connected with the sector gear element (31).

In operation, as in FIG. 3, when the operating lever (14) is rotated upwardly as indicated by the arrow ①, the sector gear element (31) is rotated anticlockwise about the axis of shaft (28) as indicated by the arrow (②), which causes simultaneous clockwise rotation (as in the direction of arrow (③)) of the ratchet gear element (30) whose sector gear portion (33) is meshed with the sector gear portion (32) of sector gear element (31). As indicated by the arrow ④, such rotation of ratchet gear element (30) in turn brings the first outwardly-toothed gear teeth (26u) of the first sector gear piece (30b) into meshed engagement with the first ratchet gear wheel (12U). Simultaneously therewith, the first ratchet gear wheel (12U) is rotated anticlockwise in the direction of arrow (⑤), causing likewise rotation of the shaft (20), whereupon the shaft (16a) of brake unit (16) is rotated anticlockwise, thereby transmitting required reverse rotation to the previously stated reverse-rotation-type seat lifter (SL'). Accordingly, a user or seat occupant, who rotates the operating lever (14) upwardly, can directly cause upward motion of the seat lifter (SL') via the associated transmission mechanism (85a, 85c and 80), thereby raising the seat back frame (or a seat (not shown)) mounted on the seat lifter (SL').

Of course, while not shown, it is to be easily understood that downward rotation of the operating elver (14) causes clockwise rotation of the sector gear element (31) and simultaneous anticlockwise rotation of the ratchet gear element (30), thereby bringing the second outwardly-toothed gear teeth (26d) of the second sector gear pawl piece (30c) into meshed engagement with the second ratchet gear wheel (12D), so that the second ratchet gear wheel (12D) is rotated clockwise. In that instance, both shaft (20) and brake unit shaft (16a) are rotated clockwise, thereby transmitting required reverse rotation to the reverse-rotation-type seat lifter (SL'), and therefore, the user or seat occupant can actuate the seat lifter (SL') through normal downward rotation of the operation lever (14) so as to lower the seat cushion frame (F) or seat.

Figure 4:
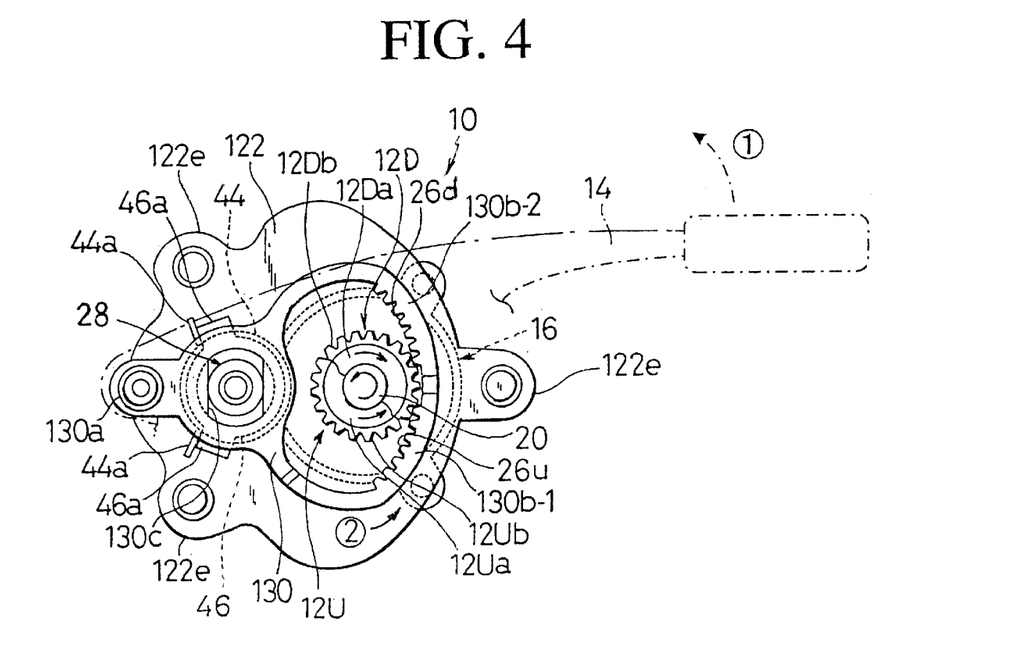
FIG. 4 is a schematic front view showing a second alternative embodiment of the a ratchet-type lever mechanism in accordance with the present invention.
Figure 6:
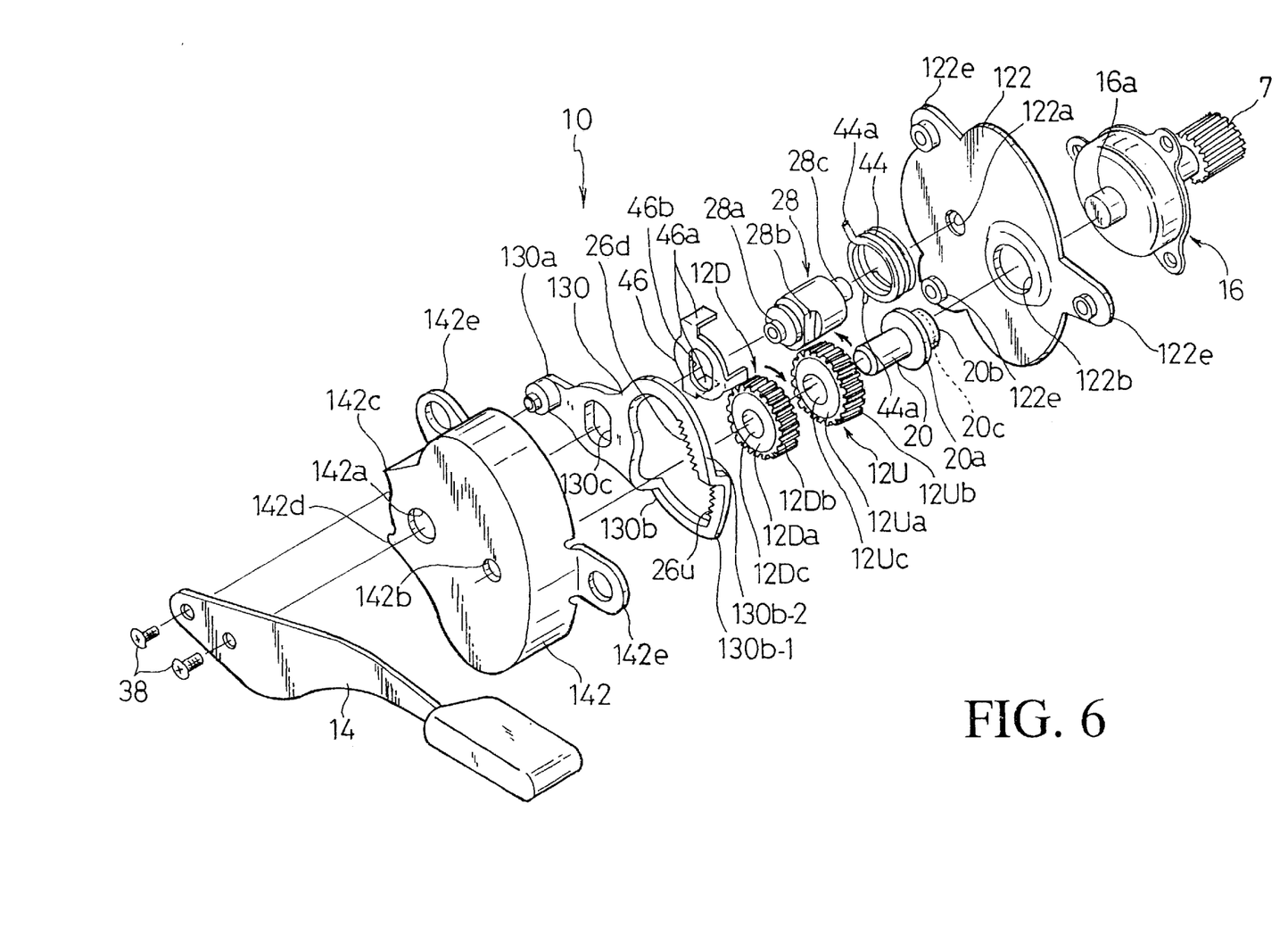
FIG. 6 is an explosive schematic view of the second alternative embodiment of the FIG. 4.

Referring to FIGS. 4 and 6, another alternative exemplary mode of the ratchet-type lever mechanism (10) will be described.

As can be seen from FIG. 6 the mechanism (10) is provided as one unit having a base plate (122) and a housing cover (142), in which principal mechanical elements to be described are collectively accommodated. The base plate (122) is formed with a first bearing hole (122a) and a second bearing hole (122b). The housing cover (142) is likewise formed with first and second bearing holes (142a) (142b) which are respectively in correspondence with those two bearing holes (122a) and (122b).

The present second mode as shown in FIGS. 4 and 6 is identical to the first mode described above in terms of the brake unit (16), the connecting shaft (20), the first and second ratchet gear wheels (12U) (12D), the spring connection plate (46), the coil spring (44), the bearing shaft (28), and the operating lever (14). Thus, further repetition of those common parts and elements is omitted and all like designations to be given hereinafter correspond to all like designations that have been used above.

As shown, the bearing portion (20b) of the connecting shaft (20) is rotatably supported in the second bearing hole (122b) of base plate (122), and, under that state, the shaft (16a) of brake unit (16) is fixedly engaged in the circular connecting recession (20b) of connecting shaft (20) (preferably via spline connection), while the two ratchet gear wheels (12U) (12D) are, at their respectie securing holes (12Uc) (12Dc), fixed on the connecting shaft (20) (preferably via spline connection). The end of that connecting shaft (20) is rotatably supported in the second bearing hole (142b) of housing cover (142). Hence, the two gear wheels (12U) (12D) are rotatabily jounalled between the base plate (122) and housing cover (142) such that either of the two gear wheels (12U) (12D) is rotatable to thereby cause simultaneous rotation of the brake unit shaft (16a) in a corresponding direction of rotation.

In the present embodiment, generically stated, as an alternative to the above-described outwardly-toothed-type sector gear means, there is provided an inwardly toothed sector gear means contemplated as another alternative mode of the aforementioned gear means for transmitting one of normal upward and downward rotations of operation lever into a proper rotation for causing rotation of a corresponding one of the two ratchet gear wheels so as to cause upward and downward motions of the reverse-rotation-type seat lifter (SL').

As depicted in the FIGS. 4 and 6, such inwardly toothed sector gear means may be embodied by an inwardly toothed ratchet gear element (130) which has, defined therein, a sectorial ring body (130b), a non-circular securing hole (130c) and a securing end portion (130a). The sectorial ring body (130b) is formed by: a first inwardly-toothed sector gear section (130b-1) having first inwardly-toothed arcuate gear teeth (26u) defined therein; and a second inwardly-toothed sector gear section (130b-2) having second inwardly-toothed arcuate gear teeth (26d) such that the former (130b-1) is bent from the latter (130b-2) in an offset fashion. It is seen that, in the ratchet gear element (130), the sectorial ring body (130b) is disposed in a diametrically opposed relation with the securing end portion (130a) in respect to the securing hole (130c). Also, it is seen that the securing end portion (130a) is disposed on the rectilinear line extending through a center point from which the sectorial ring body (130b) are divided into the first and second inwardly-toothed sector gear sections (130b-1) (130b-2). The center of the non-circular securing hole (130c) is also disposed on such rectilinear line, serving as a rotation center of the ratchet gear element (130).

As illustrated, the bearing shaft (28) is at one end (28c) thereof rotataby fitted in the first bearing hole (122a) of base plate (122), while being at another end (28a) thereof rotatably fitted in the bearing hole (142a) of housing cover (142).

It is noted here that all centers of the bearing holes (122a, 122b, 142a and 142b) are disposed on the same rectilinear line, and so are all the axes of the two shafts (20 and 28) between the base plate (122) and housing cover (142).

As understandable from FIG. 6, the spring connection plate (46) is securely attached at its non-circular hole (46b) about the peripheral circular surfaces and non-circular regions (28b) of the bearing shaft (28). A spiral spring (44) is wound about the bearing shaft (28), with the two ends (44a) (44a) thereof being contacted with the two lugs (46a) (46a) of spring connection plate (46). Also, the inwardly toothed sector gear element (130) is securely attached at its non-circular hole (130c) about the peripheral circular surfaces and non-circular regions (28b) of bearing shaft (28) and thus juxtaposed with the spring connection plate (46). Hence, both of those plate (46) and sector gear element (130) are retained on the shaft (28) in an integral way against rotation thereabout, but is free to rotate via the shaft (28) between the base plate (122) and housing cover (142).

As best seen in FIG. 4, the inwardly toothed ratchet gear element (130) includes an arcuate ring region in which are defined the first and second inwardly-toothed sector gear sections (130b-1) (130b-2), and such arcuate ring region extends along the circumference of a circle having a center at the axis of the shaft (28). Therefore, those two sector gear sections (130b-1) (130b-2) as well as their respective inwardly-toothed gear teeth (26u) (26d) extend along such circumference of circle. On the other hand, as understandable from both FIGS. 4 and 6, the first and second ratchet gear wheels (12U) (12D) are disposed within the sectorial ring body (130b) of inwardly toothed ratchet gear element (130) and both of those gear wheels (12U) (12D) are so situated as to contact the above-discussed circumference of circle. Accordingly, one of the two gear teeth (26Ub) and (26Db) respectively of those two ratchet gear wheels (12U) (12D) are in the state of being engageable with a corresponding one of the first and second inwardly-toothed sector gear sections (130b-1) (130b-2).

Though not clearly shown, the housing cover (142) has a pair of lugs (142c) (142d) against which the two ends (44a) (44a) of spiral spring (44) are abutted, respectively. With such structure, the inwardly toothed sector gear element (130) is normally biased by the spring (44) to a neutral point where the central non-toothed bent area between the first and second sector gear sections (130b-1) (130b-2) is positioned on the aforementioned rectilinear line along which all the two shafts (20 and 28) are disposed. Under this normal inoperative state, the first and second inwardly-toothed gear teeth (26u) (26d) are positioned at that central non-toothed bent area of sector gear element (130) and out of mesh with the respective first and second ratchet gear wheels (12U) (12D). Also, the operating lever (14) is normally retained by the biasing force of the spring (44) in a non-use position as indicated by the one-dot chain line in FIG. 4.

As can be seen from FIG. 6, the base plate (122) are firmly coupled with the housing cover (142) by fixedly connecting the securing ends (122e) of the former with the ends (142e) of the former by means of suitable bolts and nuts (not shown).

The operating lever (14) is at its base portion fixedly connected with the connection end portion (130a) of the inwardly toothed sector gear element (130) and another end (28a) of the shaft (28) by means of two securing screws (38) (38). Thus, the operating lever (14) is supported by the shaft (28) and connected with the gear element (130). As seen from FIG. 4, in the assembled unit of this mechanism (10), under the biasing force of the spring (44), the operating lever (14) is normally retained in a neutral non-use position, while the first and second outwardly-toothed gear teeth (26u) (26d) are both out of mesh with the corresponding first and second ratchet gear wheels (12U) (12D).

In operation, when the operating lever (14) is rotated upwardly as indicated by the arrow ①, the inwardly-toothed sector gear element (130) is rotated anticlockwise about the axis of shaft (28) as indicated by the arrow (②). Simultaneous therewith, the first inwardly-toothed gear teeth (26u) is brought to meshed engagement with the gear teeth (12Ua) of first ratchet gear wheel (12U), thereby causing anticlockwise rotation of the shaft (20), whereupon the shaft (16a) of brake unit (16) is rotated anticlockwise, thereby transmitting required reverse rotation to the previously stated reverse-rotation-type seat lifter (SL'). Accordingly, a user or seat occupant, who rotates the operating lever (14) upwardly, can directly actuate the seat lifter (SL') to cause upward rotation of both forward and backward links (80) (81), thereby raising a seat (not shown) mounted on the seat lifter (SL').

While not shown, needless to state, it is to be understood that downward rotation of the operating elver (14) causes simultaneous clockwise rotation of the inwardly-toothed ratchet gear element (130), thereby bringing the second outwardly-toothed gear teeth (26d) of the second sector gear pawl piece (30c) into meshed engagement with the second ratchet gear wheel (12D), so that the second ratchet gear wheel (12D) is rotated clockwise. In that instance, both shaft (20) and brake unit shaft (16a) are rotated clockwise, thereby transmitting required reverse rotation to the reverse-rotation-type seat lifter (SL'), and therefore, the user or seat occupant can actuate the seat lifter (SL') through normal downward rotation of the operation lever (14) so as to lower the seat. In the present embodiment, the use of the inwardly toothed ratchet gear element (130) is advantageous in that it can be directly connected with the operating lever (14) in contrast to the first embodiment of FIGS. 3 and 5 which requires the two sector gear portions (32) (33), thereby simplifying the structure of the ratchet-type drive mechanism (10) with reduced number of parts.

From the descriptions above, it is appreciated that, in accordance with the present invention, a use or a seat occupant can usually rotate the operating lever upwardly and downwardly in the revere-rotation-type seat lifter without any care about the difference of rotation of the lever and without any confusion, and that the ratchet-type drive mechanism (10) is provided as one unit that can accommodate known ratchet gear wheels and shafts with simplified sector gear structure (at 30 and 31 or at 130), thus allowing the drive mechanism per se to be directly provided between an operating lever and any existing known reverse-rotation-type seat lifter without any special connecting parts and elements, which contributes to the reduction of parts and costs involved.

Finally, it should be understood that the present invention is not limited to the illustrated embodiment, but any other modification, replacement and addition may be structurally applied thereto without departing from the scopes of the appended claims.

What is claimed is:

1. In combination with a seat lifter means which is subjected to upward motion and downward motion, respectively, in response to a normal first rotation of an operating lever and a normal second rotation of the operating lever opposite to the normal first rotation, in which the seat lifter means includes: a brake means having a shaft operatively connected therewith, said brake means being adapted to provide a braking action to the upward and downward motions of the seat lifter means and being rotatable in one of a first direction and a second direction opposite to the first direction; and a transmission mechanism operatively connected between said brake means and said seat lifter means, said transmission mechanism requiring a reverse rotation of said operating lever to cause said upward and downward motions of the seat lifter means in contrast to said normal first and second rotations of the operating lever, wherein rotation of the shaft of said brake means in said first direction is converted via said transmission mechanism into said downward motion of the seat lifter means, whereas rotation of the shaft of said brake means in said second direction is converted via said transmission mechanism into said upward motion of the seat lifter means,
   a ratchet-type lever mechanism comprising:
      a first ratchet gear wheel means rotatably provided about said shaft of said brake means; said first ratchet gear wheel means being so designed to be rotatable together with the shaft of the brake means only when the shaft of the brake means is rotated in said first direction;
      a second ratchet gear wheel means rotatably provided about said shaft of said brake means; said second ratchet gear wheel means being so designed to be rotatable together with the shaft of the brake means only when the shaft of the brake means is rotated in said second direction;
      a shaft means rotatably disposed in a spaced-apart relation with the shaft of the brake means; said shaft means being connected with said operating lever such that a center of rotation of the operating lever is at a central axis of the shaft means;
      a ratchet gear means operatively provided between said shaft means and said first and second ratchet gear wheel means, said ratchet gear means including:
         a sector gear means for transforming said reverse rotation of the operating lever required by said transmission mechanism into one of said normal first and second rotations of the operating lever, to thereby cause the shaft of the brake means to rotate in same direction as one of said normal first and second rotations of the operating lever, so that the normal first rotation of the operating lever causes the shaft of the brake means to rotate in the first direction, whereas the normal second rotation of the operating lever causes the shaft of the brake means to rotate in the second direction,
         said sector gear means having, defined circumferentially thereof, a first arcuate gear means and a second arcuate gear means in such a manner that said first arcuate gear means is defined in an offset relation with said second arcuate gear means with respect to a center of said ratchet gear means, with such an arrangement that, when said operating lever is positioned in a non-use position; said ratchet gear means is normally positioned in a neutral point where the first and second arcuate gear means are out of engagement with said first and second ratchet gear wheel means, respectively, and that, when said normal first rotation of the operating lever is effected from said non-use position to cause said upward motion of said seat lifter means, said ratchet gear means is rotated to bring said first arcuate gear means to meshed engagement with said first ratchet gear wheel means, whereas, when said normal second rotation of the operating lever is effected to cause said downward motion of said seat lifter means, said ratchet gear means is rotated to bring said second arcuate gear means to meshed engagement with said second ratchet gear wheel means; and
      a base support means on which said shaft of said brake means is mounted;
      wherein said shaft means associated with said operating lever and said sector gear means are all rotatable supported on said base support means as one unit, and
      wherein the normal first rotation of said operating lever from said non-use position brings said first arcuate gear teeth to meshed engagement with said first ratchet gear wheel means, thereby causing rotation of said shaft of said brake means in said first direction so as to cause said upward motion of said seat lifter means via said transmission mechanism, whereas the normal second rotation of said operating lever from said non-use position brings said second arcuate gear teeth to meshed engagement with said second ratchet gear wheel means, thereby causing rotation of said shaft of said brake means in said second direction so as to cause said downward motion of said seat lifter means via said transmission mechanism.

2. The ratchet-type lever mechanism as defined in claim 1, wherein a biasing means is provided about said shaft means so as to normally bias said operating lever toward said non-use position while normally biasing said ratchet gear means toward said neutral point.

3. The ratchet-type lever mechanism as defined in claim 1, wherein said first arcuate gear means comprises a first inwardly-toothed sector gear teeth and said second arcuate gear means comprises a second inwardly-toothed sector gear teeth, wherein said sector gear means comprises an inwardly toothed sector ratchet gear element having a sectorial ring body in which said first and second inwardly-toothed sector gear teeth are formed, and wherein said inwardly toothed sector ratchet gear element has: a connection end portion with which said operating lever is connected; and a securing portion defined between said sectorial ring body and said connection end portion, and wherein said securing portion is fixedly connected with said shaft means.

4. In combination with a seat lifter means which is subjected to upward motion and downward motion, respectively, in response to a normal first rotation of an operating lever and a normal second rotation of the operating lever opposite to the normal first rotation, in which the seat lifter means includes: a brake means having a shaft operatively connected therewith, said brake means being adapted to provide a braking action to the upward and downward motions of the seat lifter means and being rotatable in one of a first direction and a second direction opposite to the first direction; and a transmission mechanism operatively connected between said brake means and said seat lifter means, said transmission mechanism require a reverse rotation of said operating lever to cause said upward and downward motions of the seat lifter means in contrast to said normal first and second rotations of the operating lever, wherein rotation of the shaft of said brake means in said first direction is converted via said transmission mechanism into said downward motion of the seat lifter means, whereas rotation of the shaft of said brake means in said second direction is converted via said transmission mechanism into said upward motion of the seat lifter means,
   a ratchet-type lever mechanism comprising:
      a ratchet gear wheel means rotatably provided about said shaft of said brake means; said first ratchet gear wheel means being so designed to be rotatable together with the shaft of the brake means only when the shaft of the brake means is rotated in said first direction;
      a second ratchet gear wheel means rotatably provided about said shaft of said brake means; said first second ratchet gear wheel means being designed to be rotatable together with the shaft of the brake means only when when the shaft of the brake means is rotated in said second direction;
      a shaft means rotatably disposed in a spaced-apart relation with the shaft, of the brake means; said shaft means being connected with said operating lever such that a center of rotation of the operating lever is at a central axis of the shaft means; and a ratchet gear means operatively provided between said shaft means and said first and second ratchet gear wheel means, said ratchet gear means including:

a sector gear means for transforming said reverse rotation of the operation lever required by said transmission mechanism into one of said normal first and second rotations of the operating lever to thereby cause the shaft of the brake means to rotate in same direction as one of said normal first and second rotations of the operating lever, so that the normal first rotation of the operating lever causes the shaft of the brake means to rotate in the first direction, whereas the normal second rotation of the operating lever causes the shaft of the brake means to rotate in the second direction, said sector gear means having, defined circumferentially thereof, a first arcuate gear means and a second arcuate gear means in such a manner that said first arcuate gear means is defined in an offset relation with said second arcuate gear means with respect to a center of said ratchet gear means, with such an arrangement that, when said operating lever is positioned in a non-use position, said ratchet gear means his normally positioned in a neutral point where the first and second arcuate gear means are out of engagement with said first and second ratchet gear wheel means, respectively, and that, when said normal first rotation of the-operating lever is effected from said non-use position to cause said upward motion of said seat lifter means, said ratchet gear means is rotated to bring said first arcuate gear means to meshed engagement with said first ratchet gear wheel means, whereas, when said normal second rotation of the operating lever is effected to cause said downward motion of said seat lifter mean, said ratchet gear means is rotated to bring said second arcuate gear means to meshed engagement with said second ratchet gear wheel means;

wherein said sector gear means comprises an outwardly toothed sector ratchet gear element including:

a shaft disposed between said shaft means and said shaft of said brake means;

a first outwardly-toothed sector gear element having, defined therein, a first outwardly-toothed sector gear portion and said first and second outwardly-toothed sector gear teeth in an integral manner; said first outwardly-toothed sector gear element being rotatably provided on said shaft in such a manner that said first outwardly-toothed sector gear portion is disposed in a diametrically opposed relation with said first and second outwardly-toothed sector gear teeth with respect to said shaft; and a second outwardly-toothed sector gear element including a second outwardly-toothed sector gear portion formed therein, said second outwardly-toothed sector gear element being fixedly provided on said shaft means associated with said operating lever, wherein said second outwardly-toothed sector gear portion is in a meshed engagement with said first outwardly-toothed sector gear portion; and a base support means on which said shaft and said shaft means are mounted, so that a whole of the ratchet-type lever mechanism and said sector gear means are provided as one unit;

wherein the normal first rotation of said operating lever from said non-use position brings said first arcuate gear teeth to meshed engagement with said first ratchet gear wheel means, thereby causing rotation of said shaft of said brake means in said first direction so as to cause said upward motion of staid seat lifter means via said, transmission mechanism, whereas the normal second rotation of said operating lever from said non-use position brings said second arcuate gear teeth to meshed engagement with said second ratchet gear wheel means, thereby causing rotation of said shaft of said brake means in said second direction so as to cause said downward motion of said seat lifter means via said transmission mechanism.

\* \* \* \* \*